United States Patent
Ngo et al.

(10) Patent No.: US 6,307,301 B1
(45) Date of Patent: Oct. 23, 2001

(54) BUCKLING RESISTANT PIEZOELECTRIC ACTUATOR

(75) Inventors: Hieu Thien Ngo, Gilbert; Terrence Selwyn Birchette, Chandler; Richard Karl Weisenburger; Alan Douglas Stemple, both of Mesa, all of AZ (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/497,048

(22) Filed: Feb. 2, 2000

(51) Int. Cl.$^7$ .................................................. H01L 41/08
(52) U.S. Cl. ............................................................. 310/328
(58) Field of Search ............................................... 310/328

(56) References Cited

U.S. PATENT DOCUMENTS

| | | | |
|---|---|---|---|
| 4,547,086 | * 10/1985 | Matsumoto et al. | ............ 400/124.16 |
| 4,601,539 | 7/1986 | Watanabe . | |
| 4,905,031 | 2/1990 | Mody . | |
| 5,490,015 | 2/1996 | Umeyama et al. . | |
| 5,521,764 | 5/1996 | Balogh et al. . | |
| 5,576,894 | 11/1996 | Kuwana et al. . | |
| 5,675,444 | 10/1997 | Ueyama et al. . | |
| 5,714,833 | * 2/1998 | Zumeris | ................................. 310/328 |
| 5,768,038 | 6/1998 | Emura . | |
| 5,771,095 | 6/1998 | Prikryl et al. . | |
| 6,188,161 | * 2/2001 | Yoshida et al. | ....................... 310/328 |

* cited by examiner

*Primary Examiner*—Brian Sircus
*Assistant Examiner*—Michael C. Zarroli
(74) *Attorney, Agent, or Firm*—Harness Dickey & Pierce P.L.C.

(57) ABSTRACT

A piezoelectric actuator assembly allows maximization of the cross-sectional area of a piezoelectric driver assembly such that axial stiffness of the actuator assembly is substantially increased. The actuator assembly is coupled to an application structure and includes the piezoelectric driver assembly having a stack inboard end longitudinally extending in an inboard direction with respect to the application structure. The driver assembly also has a stack outboard end longitudinally extending in an outboard direction with respect to the application structure. The driver assembly further provides a longitudinal displacement in response to an applied voltage. The actuator assembly also includes an amplification arm having an arm outboard end coupled to a load. An outboard hinge mechanism rotatably couples an arm inboard end of the amplification arm to the stack outboard end such that the arm outboard end extends in the outboard direction. Voltage signals selectively applied to the driver assembly cause rotational displacement of the amplification arm.

23 Claims, 3 Drawing Sheets

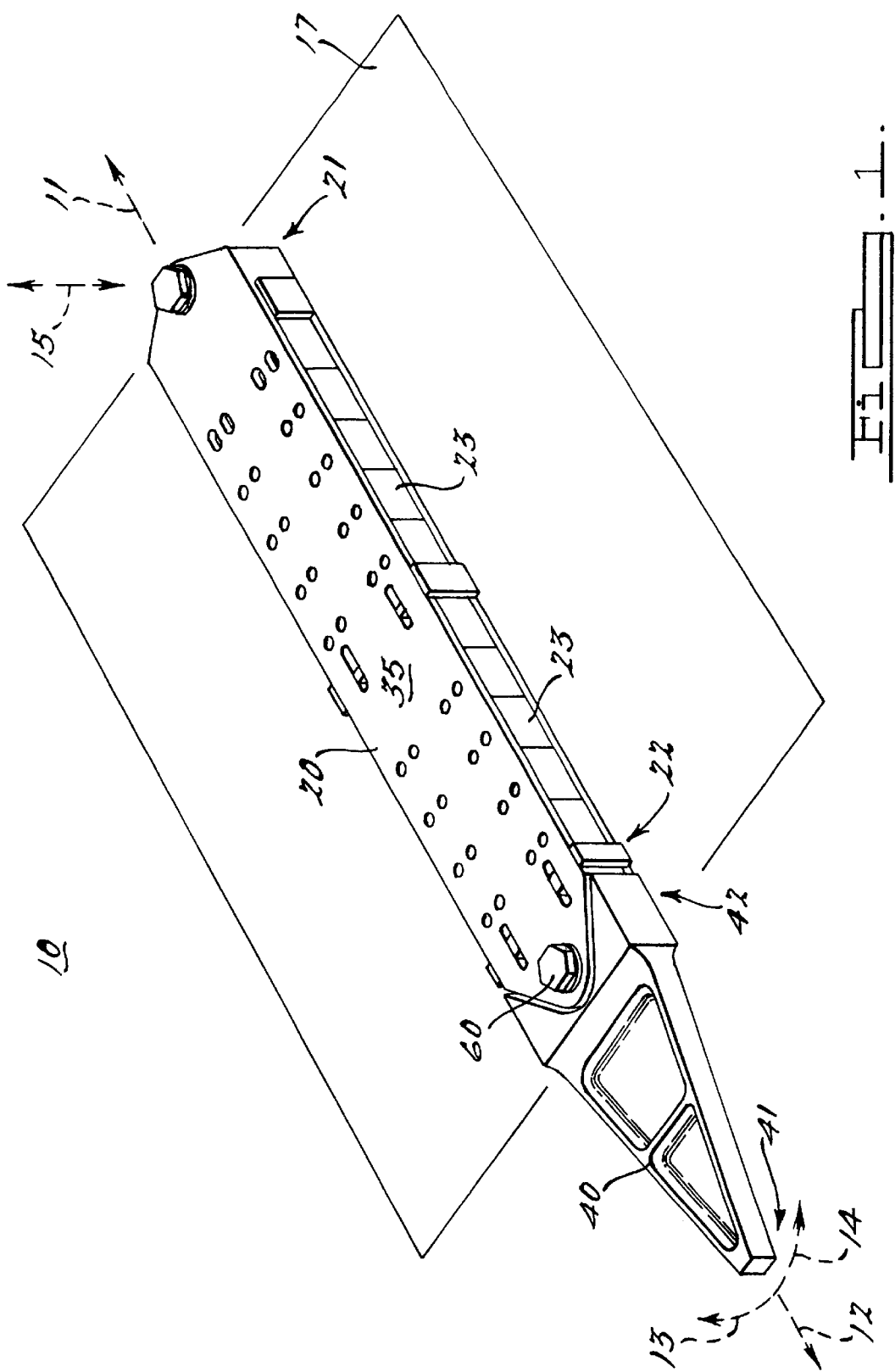

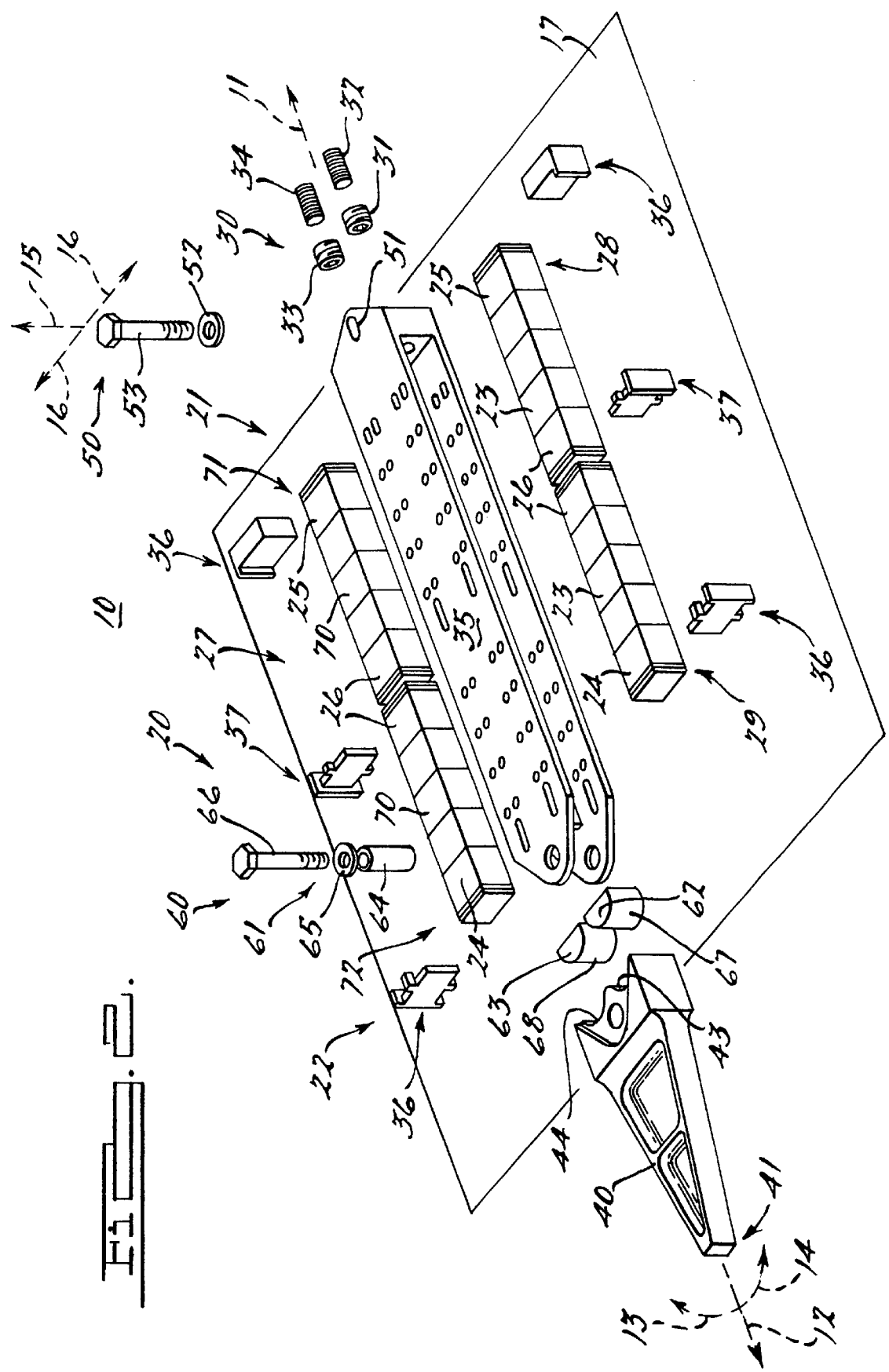

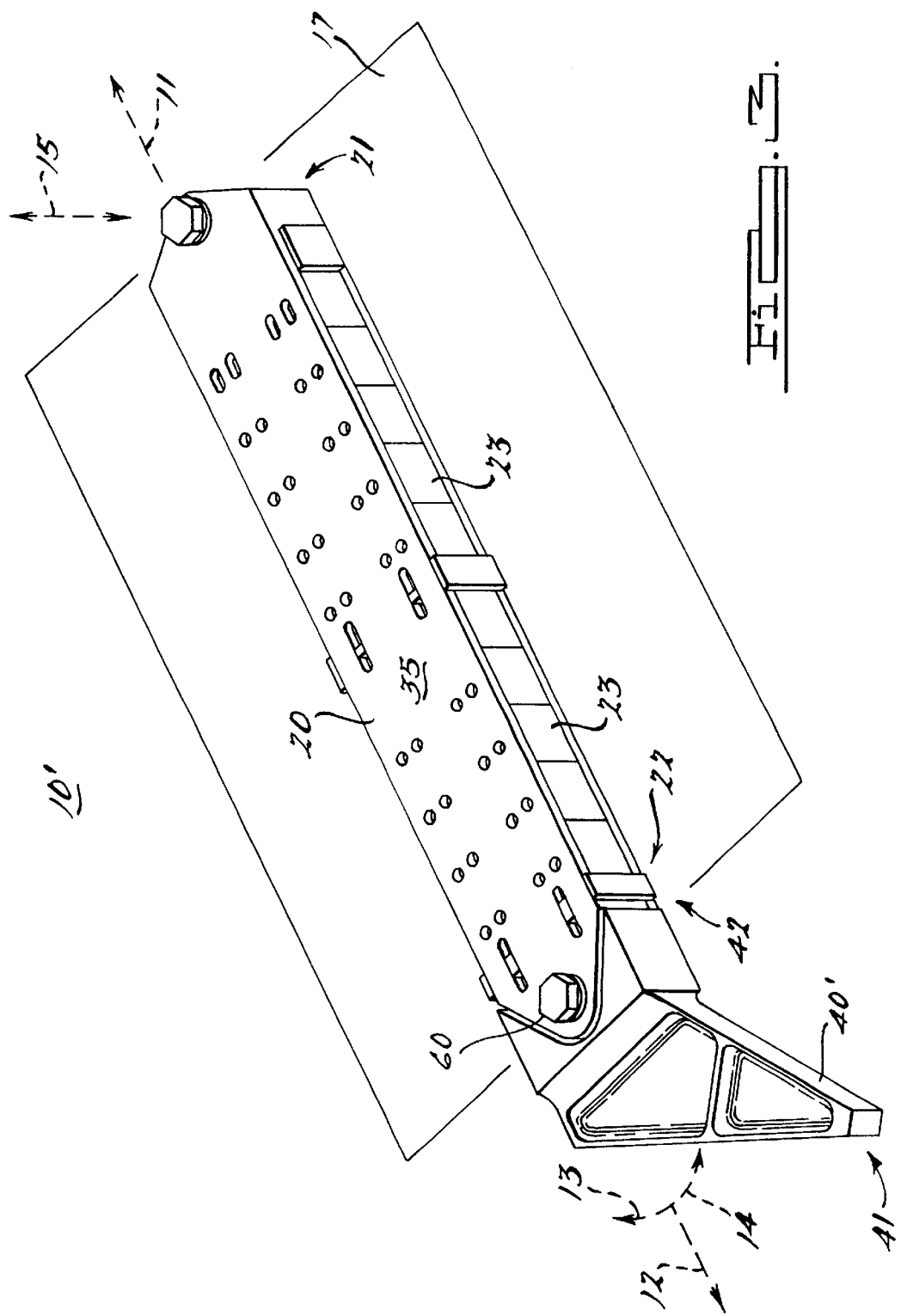

BUCKLING RESISTANT PIEZOELECTRIC ACTUATOR

The present invention was conceived or first built and tested in the course of work under U.S. Government Contract Number MDA972.98-3-0001, DARPA Smart Materials Program. The U.S. Government has certain rights in the invention.

TECHNICAL FIELD

The present invention relates generally to piezoelectric support devices. More particularly, the invention relates to a piezoelectric actuator assembly that has an amplification arm which extends in an outboard direction with respect to an attached application structure.

BACKGROUND OF THE INVENTION

BACKGROUND ART

Piezoelectric materials have become more and more widely used in a large number of applications. For example, piezoelectric materials have the potential of allowing aircraft designers to minimize the number of required moving parts with high precision as well as increased compactness. Conventional piezoelectric materials, however, generally only work well in applications that require micro-displacement such as adaptive optics, printer jet control, pressure and acoustic transducers. It is therefore desirable to provide a system and method which is readily adaptable to application structures such as aircraft and automobiles which require large displacements (or strokes) under high loads. Such a system would gain widespread acceptance in both the aviation and automotive industries.

Due to the limited strain capability (i.e. elongation per unit voltage input) of piezoelectric materials, a number of piezoelectric segments are typically fixedly coupled or glued together to obtain a useful displacement. In addition to the piezoelectric stack material, a stack supporting component is typically employed to prevent the piezoelectric stack from becoming laterally, vertically, or rotationally unstable. An amplification arm is further included to couple the piezoelectric stack to an external load as well as magnify the displacement.

An infinitely stiff actuator assembly is desired because it directly effects the actuator assembly performance. In fact, surveys of piezoelectric actuators show that more than 50% of actuator assembly compliance is due to stack longitudinal stiffness. It is further known that the cross-sectional area of the piezoelectric stack determines the amount of longitudinal stiffness. It is therefore desirable to provide a piezoelectric actuator assembly that has a very large piezoelectric stack cross-sectional area.

Conventional piezoelectric actuator assembly designs have to accommodate the actuator assembly output displacement in addition to the cross-sectional area of the piezoelectric driver assembly. Therefore, as output displacement requirements increase, there is less space available for the stack cross-sectional area. Correspondingly, if the cross-sectional area of the piezoelectric driver assembly is increased, less output displacement is available. This shortcoming associated with conventional designs is largely due to the fact that typical approaches combine the stack supporting component with the amplification arm such that the two interfere with one another. It is therefore desirable to provide an actuator assembly that has an amplification arm extending in the outboard direction with respect to the attached application structure such that the piezoelectric driver assembly can have an increased cross-sectional area.

A further concern with aircraft, automotive, and other high-force applications is inboard mounting of the actuator assembly. For example, in helicopter rotor blade applications, it is desirable to minimize the effect of external loads due to blade "flapping" motions. Thus, fixing the internal mount in the lateral direction while establishing a nonlinear spring constraint in the axial and vertical directions would enhance aircraft performance and ultimately reduce costs.

Another problem associated with implementing piezoelectric actuators in particular, is the need to preload the piezoelectric stack material. This requirement is due to the fact that piezoelectric materials generally operate best under compression of the material. Therefore, to fully capture the displacement effectiveness of the piezoelectric material, the material should be preloaded to a point of slight compression. It is therefore desirable to provide a piezoelectric actuator assembly that is preloaded to improve displacement amplification and response time.

SUMMARY OF THE INVENTION

The above drawbacks are addressed by a piezoelectric actuator assembly in accordance with a preferred embodiment of the present invention having an amplification arm extending in the outboard direction with respect to an attached application structure. Specifically, the piezoelectric actuator assembly includes a piezoelectric driver assembly coupled to the application structure. The driver assembly also has a stack inboard end longitudinally extending in an inboard direction with respect to the application structure and a stack outboard end longitudinally extending in an outboard direction with respect to the application structure. The driver assembly has a longitudinal displacement in response to an applied voltage. The amplification arm has an arm outboard end coupled to a load and an arm inboard end. The piezoelectric actuator assembly further includes an outboard hinge mechanism rotatably coupling the arm inboard end of the amplification arm to the stack outboard end such that the arm outboard end extends in the outboard direction. Extending the amplification arm in the outboard direction therefore allows elimination of the interference between the cross-sectional area of the piezoelectric driver assembly and output displacement of the actuator assembly.

Further in accordance with the present invention, the driver assembly has a first piezoelectric stack and a second piezoelectric stack. The hinge mechanism includes an axis connection mechanism extending through the driver assembly and the amplification arm where the hinge mechanism is fixedly coupled to the application structure. A first stack joint is fixedly coupled to the first piezoelectric stack and moveably coupled to the amplification arm such that longitudinal displacement of the first piezoelectric stack in the outboard direction causes rotation of the amplification arm about the axis connection mechanism in a first output direction. A second stack joint is fixedly coupled to the second piezoelectric stack and moveably coupled to the amplification arm such that longitudinal displacement of the second piezoelectric stack in the outboard direction causes rotation of the amplification arm about the axis connection mechanism in a second output direction. The second output direction is generally opposite to the first output direction.

The present invention also provides a method for displacing a load. The method includes the step of longitudinally extending an inboard end of a piezoelectric driver assembly in an inboard direction with respect to an attached application structure. A stack outboard end of the piezoelectric driver assembly is extended in an outboard direction with respect to the application structure. The method further includes the step of generating longitudinal displacement of the driver assembly in response to an applied voltage. An outboard end of an amplification arm is coupled to the load, and an arm inboard end of the amplification is rotatably coupled to the stack outboard end. Thus, the arm outboard end extends in the outboard direction and allows maximization of the cross-sectional area of the piezoelectric driver assembly.

BRIEF DESCRIPTION OF THE DRAWINGS

The various advantages of the present invention will become apparent to one of ordinary skill in the art by reading the following specification and subjoined claims and by referencing the following drawings in which:

FIG. 1 is an isometric view of a piezoelectric actuator assembly in accordance with a preferred embodiment of the present invention;

FIG. 2 is an exploded isometric view of the piezoelectric actuator assembly shown in FIG. 1; and FIG. 3 is an isometric view of a piezoelectric actuator assembly with the amplification arm biased in a second output direction in accordance with an alternative embodiment of the present invention.

DETAILED DESCRIPTION OF THE PREFERRED EMBODIMENTS

Referring to FIG. 1, a preferred piezoelectric actuator assembly 10 coupled to an application structure 17 having an inboard direction 11 and an outboard direction 12 is shown in an isometric view. Actuator assembly 10 includes a piezoelectric driver assembly 20, an amplification arm 40, and an outboard hinge mechanism 60. The driver assembly 20 has a stack inboard end 21 longitudinally extending in the inboard direction 11 and a stack outboard end 22 longitudinally extending in the outboard direction 12. It will be appreciated that the driver assembly 20 has a longitudinal displacement in response to an applied voltage. Driver assembly 20 therefore serves as the "motor" portion of actuator assembly 10. The amplification arm 40 provides displacement and output redirection, and has an arm outboard end 41 coupled to a load (not shown). It will be appreciated that the amplification arm 40 is similar to a gearbox or transmission. Thus, separating motor and gearbox components allows each component to be modified without affecting the other component. The outboard hinge mechanism 60 rotatably couples an arm inboard end 42 of the amplification arm 40 to the stack outboard end 22 such that the arm outboard end 41 extends in the outboard direction 12. Thus, the axis of stack motion is independent of the output motion. The cross-sectional area of the driver assembly 20 can therefore be maximized without restricting displacement of the arm outboard end 41 of the amplification arm 40. Maximization of the cross-sectional area of the driver assembly 20 in turn allows maximization of the axial stiffness of actuator assembly 10. It will further be appreciated that while directions 11 and 12 are referred to as inboard and outboard directions, respectively, actuator assembly 10 can be readily adapted to provide displacement in a wide variety of high load applications.

Turning now to FIG. 2, it can be seen that the driver assembly 20 preferably includes a first piezoelectric stack 23 and a second piezoelectric stack 70. It can be seen that the first and second piezoelectric stacks 23, 70 are divided into sub-stacks by intermediate restraint subassembly 37. Each sub-stack has 5 stack elements. It will be appreciated that the number of stack elements can vary depending on stack material and size. The modular nature of the driver assembly 20 allows the actuator assembly 10 to be easily modified for greater outputs. The outboard hinge mechanism 60 has an axis connection mechanism 61 extending through the driver assembly 20 and the amplification arm 40. A first stack joint 62 is fixedly coupled to the first piezoelectric stack 23 and moveably coupled to the amplification arm 40 such that longitudinal displacement of the first piezoelectric stack 23 in the outboard direction 12 causes rotation of the arm outboard end 41 about the axis connection mechanism 61 in a first output direction 13. A second stack joint 63 is fixedly coupled to the second piezoelectric stack 70 and movably coupled to the amplification arm 40 such that longitudinal displacement of the second piezoelectric stack 70 in the outboard direction 12 causes rotation of the arm outboard end 41 about the axis connection mechanism 61 in a second output direction 14.

It can also be seen that the axis connection mechanism 61 preferably includes a stationary bushing 64 extending through the driver assembly 20, and a flat washer 65. An outboard mount bolt 66 extends through the stationary bushing 64 and the flat washer 65, wherein the application structure 17 or other suitable fastening mechanism is coupled to the outboard mount bolt on the other side of the driver assembly 20. The stationary bushing 64 and the flat washer 65 are therefore sandwiched between the application structure 17 and the head of the outboard mount bolt 66 such that a single axis of rotation is created. It can further be seen that the first stack joint 62 has a first joint curvature 67 and the amplification arm 40 has a amplification arm first curvature 43 moveably receiving the first joint curvature 67. Similarly, the second stack joint 63 has a second joint curvature 68 and the amplification arm 40 has an amplification arm second curvature 44 moveably receiving second joint curvature 68.

It will be appreciated that the first and second piezoelectric stacks 23, 70 of the driver assembly 20 make up a piezoelectric stack configuration having a first column end 24, a second column end 25, and a first intermediate section 26. As already discussed, it is preferred that the stack configuration include a first piezoelectric stack 23 for providing rotation of the amplification arm 40 in the first output direction 13, and a second piezoelectric stack 70 for providing rotation of the amplification arm 40 in the second output direction 14. The driver assembly 20 further includes a rigid support device 27 longitudinally aligned with the stack configuration. The support device 27 is moveably coupled to the stack configuration at the first and second column ends 24, 25 such that rotational displacement of the stack configuration is restrained at the column ends 24, 25 and longitudinal displacement of the stack configuration is permitted at the column ends 24, 25. The support device 27 is also moveably coupled to the stack configuration at the first intermediate section 26 such that rotational displacement of the stack configuration is restrained at the first intermediate section 26 and longitudinal displacement of the stack configuration is permitted at the first intermediate section 26. It can be seen that the first piezoelectric stack 23 has a first inboard end 28 longitudinally extending in the inboard direction 11 and a first outboard end 29 longitudinally extending in the outboard direction 12. Similarly, the second piezoelectric stack 70 has a second inboard end 71 longitudinally extending in the inboard direction 11 and a second outboard end 72 longitudinally extending in the outboard direction 12.

FIG. 3 demonstrates an alternative actuator assembly 10'. Specifically, actuator assembly 10' has an amplification arm 40' which is biased at a predetermined bias angle in the second output direction 14. Of course, amplification arm 40' can also be biased in the first output direction 13 and at any desired angle. Furthermore, as discussed below, the first and second piezoelectric stacks 23, 70 can provide biasing of the output arm 40' depending on the voltage applied to each piezoelectric stack 23, 70.

Returning to FIG. 2, it can be seen that a preload system 30 biases the first inboard end 28 of the first piezoelectric stack 23 at a first stack pre-compression, and further biases the second inboard end 71 of the second piezoelectric stack 70 at a second stack pre-compression. It will be appreciated that the first and second stack pre-compressions can be selected to balance the output arm at any initial output displacement desired. It can further be appreciated that if either of the piezoelectric stacks 23, 70 is retracted in length (by decreasing the applied voltage to cause longitudinal displacement in the inboard direction), the preload system 30 will provide displacement of the amplification arm 40. Preferably, the preload system 30 includes a first threaded insert 31 coupled to the support device 27, and a first preload screw 32 extending through the first threaded insert 31 and contacting the first inboard end 28 of the first piezoelectric stack 23. A second threaded insert 33 is also coupled to the support device 27, and a second preload screw 34 extends through the second threaded insert 33 and contacts the second inboard end 71 of the second piezoelectric stack 70. Threaded inserts 31, 33 are preferably off-the-shelf threaded inserts used to increase the contact area between preload screws 32, 34 and driver support structure 35. Increased contact area is desirable largely due to the hardness of preload screws 32, 34 (preferably steel) and relative softness of driver support structure 35 (preferably aluminum). If weight is not a concern, however, driver support structure 35 can be made of steel and threaded inserts 31, 33 would not be needed. While the use of steel for driver support structure 35 would increase performance and reduce cost, weight is typically of primary importance to rotor blade and other aviation applications.

It can further be appreciated that the support device 27 has a driver support structure 35 disposed adjacent to the stack configuration, and an end restraint assembly 36 fixedly coupled to the column ends 24, 25 and moveably coupled to the support device 27. An intermediate restraint subassembly 37 is fixedly coupled to the first intermediate section 26 and moveably coupled to the support device 27. The intermediate restraint subassembly 37 provides lateral support to prevent buckling. The intermediate restraint subassembly 37 is also designed to minimize performance losses due to Hertzian stresses.

It can further be seen that the driver assembly 20 preferably includes an inboard mounting assembly 50 for mounting the stack inboard end 21 to the application structure 17 such that a nonlinear spring restraint is provided for the actuator assembly 10 with respect to the application structure 17 in the inboard direction 11, the outboard direction 12, and a vertical direction 15. The inboard mounting assembly 50 restrains the actuator assembly 10 with respect to the application structure 17 in a lateral direction 16. The inboard mounting assembly 50 preferably includes an oval shaped mount aperture 51 extending through the driver assembly 20 in the vertical direction 15, and a resilient washer 52. An inboard mount bolt 53 extends through the oval shaped mount aperture 51 and the resilient washer 52. The application structure 17 or other suitable mechanism is coupled to the inboard mount bolt 53 such that the resilient washer 52 and the driver assembly 20 are sandwiched between the application structure 17 and the head of the inboard mount bolt 53.

The present invention therefore provides a method for displacing a load, wherein the method includes the step of longitudinally extending a stack inboard end 21 of a piezoelectric driver assembly 20 in an inboard direction 11. A stack outboard end 22 of the piezoelectric driver assembly 20 is extended longitudinally in an outboard direction 12. The method further includes the step of generating longitudinal displacement of the driver assembly 20 in response to an applied voltage. An arm outboard end 41 of an amplification arm 40 is coupled to the load. Thus, rotatably coupling an arm inboard end 42 of the amplification arm 40 to the stack outboard end 22 allows the arm outboard end 41 to be extended in the outboard direction 12. It will be appreciated that the outboard direction 12 is defined as a generally opposite direction to the inboard direction 11, and is not necessarily parallel to outboard direction 12 as indicated in FIGS. 1 and 2.

By extending an axis connection mechanism 61 through the driver assembly 20 and the amplification arm 40, a single axis of rotation for the amplification arm 40 is created. The present invention further provides for fixedly coupling a first stack joint 62 to the first piezoelectric stack 23, and moveably coupling the first stack joint 62 to the amplification arm 40 such that longitudinal displacement of the first piezoelectric stack 23 in the outboard direction 12 causes rotation of the arm outboard end 41 about the axis connection mechanism 61 in the first output direction 13. Similarly, the present invention provides for fixedly coupling a second stack joint 63 to the second piezoelectric stack 70, and moveably coupling the second stack joint 63 to the amplification arm 40 such that longitudinal displacement of the second piezoelectric stack 70 in the outboard direction 12 causes rotation of the arm outboard end 41 about the axis connection mechanism 61 in the second output direction 14. Thus, by selectively applying voltage signals to piezoelectric stacks 23 and 70, various displacements of the amplification arm 40 can be achieved. Increasing the voltage to first piezoelectric stack 23 and decreasing the voltage to the second piezoelectric stack 70 causes rotation of the amplification arm 40 in the first output direction 13. Similarly, increasing the voltage to second piezoelectric stack 70 and decreasing the voltage to first piezoelectric stack 23 causes rotation of the amplification arm 40 in the second output direction 14.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims:

What is claimed is:

1. A piezoelectric actuator assembly for displacing a load comprising:

a piezoelectric driver assembly coupled to an application structure, the driver assembly having a stack inboard end longitudinally extending in an inboard direction with respect to the application structure and a stack outboard end longitudinally extending in an outboard direction with respect to the application structure, the driver assembly having a longitudinal displacement in response to an applied voltage;

an amplification arm having an arm outboard end coupled to a load and an arm inboard end; and an outboard hinge mechanism rotatably coupling the arm inboard end of the amplification arm to the stack outboard end such that the arm outboard end extends in the outboard direction and both arm ends are positioned on a same side of the hinge mechanism.

2. The actuator assembly of claim 1 wherein the driver assembly further includes a first piezoelectric stack and a second piezoelectric stack, the outboard hinge mechanism including:

an axis connection mechanism extending through the driver assembly and the amplification arm, the axis connection mechanism fixedly coupled to the application structure;

a first stack joint fixedly coupled to the first piezoelectric stack and moveably coupled to the amplification arm such that longitudinal displacement of the first piezoelectric stack in the outboard direction causes rotation of the arm outboard end about the axis connection mechanism in a first output direction; and a second stack joint fixedly coupled to the second piezoelectric stack and moveably coupled to the amplification arm such that longitudinal displacement of the second piezoelectric stack in the outboard direction causes rotation of the arm outboard end about the axis connection mechanism in a second output direction.

3. The actuator assembly of claim 2 wherein the axis connection mechanism includes:

a stationary bushing extending through the driver assembly;

a washer; and an outboard mount bolt extending through the stationary bushing and the washer, said outboard mount bolt coupled to the application structure such that the stationary bushing and the washer are sandwiched between the application structure and a head of the outboard mount bolt.

4. The actuator assembly of claim 2 wherein the first stack joint has a first joint curvature and the amplification arm has a amplification arm first curvature moveably receiving the first joint curvature.

5. The actuator assembly of claim 2 wherein the second stack joint has a second joint curvature and the amplification arm has an amplification arm second curvature moveably receiving the second joint curvature.

6. The actuator assembly of claim 1 wherein the driver assembly further includes:

a piezoelectric stack configuration having a first column end, a second column end, and a first intermediate section; and a rigid support device longitudinally aligned with the stack configuration, the support device moveably coupled to the stack configuration at the first and second column ends such that rotational displacement of the stack configuration is restrained at the column ends and longitudinal displacement of the stack configuration is permitted at the column ends;

said support device moveably coupled to the stack configuration at the first intermediate section such that rotational displacement of the stack configuration is restrained at the first intermediate section and longitudinal displacement of the stack configuration is permitted at the first intermediate section.

7. The actuator assembly of claim 6 wherein the stack configuration includes:

a first piezoelectric stack for providing rotation of the amplification arm in a first output direction, the first piezoelectric stack having a first inboard end longitudinally extending in the inboard direction and a first outboard end longitudinally extending in the outboard direction; and a second piezoelectric stack for providing rotation of the amplification arm in a second output direction, the second piezoelectric stack having a second inboard end longitudinally extending in the inboard direction and a second outboard end longitudinally extending in the outboard direction.

8. The actuator assembly of claim 7 wherein the driver assembly further includes a preload system for biasing the first inboard end of the first piezoelectric stack at a first stack pre-compression, the preload system further biasing the second inboard end of the second piezoelectric stack at a second stack pre-compression, wherein the first stack pre-compression and the second stack pre-compression balance the amplification arm at an initial output displacement.

9. The actuator assembly of claim 8 wherein longitudinal displacement of the first piezoelectric stack in the inboard direction causes rotation of the arm outboard end about the axis connection mechanism in a second output direction and longitudinal displacement of the second piezoelectric stack in the inboard direction causes rotation of the arm outboard end about the axis connection mechanism in a first output direction.

10. The actuator assembly of claim 8 wherein the preload system includes:

a first threaded insert coupled to the support device;

a first preload screw extending through the first threaded insert and contacting the first inboard end of the first piezoelectric stack;

a second threaded insert coupled the support device; and a second preload screw extending through the second threaded insert and contacting the second inboard end of the second piezoelectric stack.

11. The actuator assembly of claim 6 wherein the support device further includes:

a driver support structure disposed adjacent to the stack configuration;

an end restraint assembly fixedly coupled to the column ends and moveably coupled to the driver support structure; and an intermediate restraint subassembly fixedly coupled to the first intermediate section and moveably coupled to the driver support structure.

12. The actuator assembly of claim 1 wherein the driver assembly further includes an inboard mounting assembly for mounting the stack inboard end to the application structure such that a nonlinear spring restraint is provided for the actuator assembly with respect to the application structure in the inboard direction, the outboard direction, and a vertical direction, the inboard mounting assembly restraining the actuator assembly with respect to the application structure in a lateral direction.

13. The actuator assembly of claim 12 wherein the inboard mounting assembly includes:

an oval shaped mount aperture extending through the driver assembly in the vertical direction;

a resilient washer; and an inboard mount bolt extending through the oval shaped mount aperture and the resilient washer, said inboard mount bolt coupled to the application structure such that the resilient washer and the driver assembly are sandwiched between the application structure and a head of the inboard mount bolt.

14. An outboard hinge mechanism for rotatably coupling an outboard end of a piezoelectric driver assembly to an amplification arm, the driver assembly having a first piezoelectric stack and a second piezoelectric stack, the hinge mechanism comprising:

an axis connection mechanism extending through the driver assembly and the amplification arm, the axis connection mechanism fixedly coupled to an application structure;

a first stack joint fixedly coupled to the first piezoelectric stack and moveably coupled to the amplification arm such that longitudinal displacement of the first piezoelectric stack in an outboard direction with respect to the application structure causes rotation of the amplification arm about the axis connection mechanism in a first output direction; and a second stack joint fixedly coupled to the second piezoelectric stack and moveably coupled to the amplification arm such that longitudinal displacement of the second piezoelectric stack in the outboard direction causes rotation of the amplification arm about the axis connection mechanism in a second output direction.

15. The hinge mechanism of claim 14 wherein longitudinal displacement of the first piezoelectric stack in the inboard direction causes rotation of the arm outboard end about the axis connection mechanism in a second output direction and longitudinal displacement of the second piezoelectric stack in the inboard direction causes rotation of the arm outboard end about the axis connection mechanism in a first output direction.

16. The hinge mechanism of claim 14 wherein the axis connection mechanism includes:

a stationary bushing extending through the driver assembly;

a washer; and an outboard mount bolt extending through the stationary bushing and the washer, said outboard mount bolt coupled to the application structure such that the stationary bushing and the washer are sandwiched between the application structure and a head of the outboard mount bolt.

17. The hinge mechanism of claim 14 wherein the first stack joint has a first joint curvature and the amplification arm has a amplification arm first curvature moveably receiving the first joint curvature.

18. The hinge mechanism of claim 14 wherein the second stack joint has a second joint curvature and the amplification arm has an amplification arm second curvature moveably receiving the second joint curvature.

19. A method for displacing a load, the method comprising the steps of:

longitudinally extending a stack inboard end of a piezoelectric driver assembly in an inboard direction with respect to an attached application structure;

longitudinally extending a stack outboard end of the piezoelectric driver assembly in an outboard direction with respect to the application structure;

generating longitudinal displacement of the driver assembly in response to an applied voltage;

coupling an outboard end of an amplification arm to the load; and rotatably coupling an arm inboard end of the amplification arm to the stack outboard end.

20. The method of claim 19 wherein the driver assembly further includes a first piezoelectric stack and a second piezoelectric stack, the method further including the steps of:

extending an axis connection mechanism through the driver assembly and the amplification arm;

fixedly coupling a first stack joint to the first piezoelectric stack;

moveably coupling the first stack joint to the amplification arm such that longitudinal displacement of the first piezoelectric stack in the outboard direction causes rotation of the arm outboard end about the axis connection mechanism in a first output direction;

fixedly coupling a second stack joint to the second piezoelectric stack; and moveably coupling the second stack joint to the amplification arm such that longitudinal displacement of the second piezoelectric stack in the outboard direction causes rotation of the arm outboard end about the axis connection mechanism in a second output direction.

21. The method of claim 20 further including the steps of:

biasing a inboard end of the first piezoelectric stack at a first stack pre-compression such that longitudinal displacement of the first piezoelectric stack in the inboard direction causes rotation of the arm outboard end about the axis connection mechanism in the second output direction; and biasing a second inboard end of the second piezoelectric stack at a second stack pre-compression such that longitudinal displacement of the second piezoelectric stack in the inboard direction causes rotation of the arm outboard end about the axis connection mechanism in the first output direction.

22. The method of claim 20 further including the steps of:

extending a stationary bushing through the driver assembly;

providing a washer;

extending an outboard mount bolt through the stationary bushing and the washer; and coupling the application structure to the outboard mount bolt such that the stationary bushing and the washer are sandwiched between the application structure and a head of the outboard mount bolt.

23. The method of claim 19 wherein the driver assembly further includes a piezoelectric stack configuration having a first column and, a second column end, and a first intermediate section, the method further including the steps of:

longitudinally aligning a rigid support device with the stack configuration;

moveably coupling the support device to the stack configuration at the first and second column ends such that rotational displacement of the stack is restrained at the column ends; and moveably coupling the support device to the stack configuration at the first intermediate section and that rotational displacement of the stack configuration is restrained at the first intermediate section and longitudinal displacement of the stack configuration is permitted at the first intermediate section.

* * * * *